US012757047B2

(12) United States Patent
Hu et al.

(10) Patent No.: US 12,757,047 B2
(45) Date of Patent: Oct. 6, 2026

(54) RRM MEASUREMENT RELAXATION AND INFORMATION PROCESSING METHOD AND APPARATUS, DEVICE AND STORAGE MEDIUM

(71) Applicant: Beijing Xiaomi Mobile Software Co., Ltd., Beijing (CN)

(72) Inventors: Ziquan Hu, Beijing (CN); Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 342 days.

(21) Appl. No.: 18/294,503

(22) PCT Filed: Aug. 4, 2021

(86) PCT No.: PCT/CN2021/110659
§ 371 (c)(1),
(2) Date: Feb. 1, 2024

(87) PCT Pub. No.: WO2023/010357
PCT Pub. Date: Feb. 9, 2023

(65) Prior Publication Data

US 2024/0349096 A1 Oct. 17, 2024

(51) Int. Cl.
*H04W 24/10* (2009.01)

(52) U.S. Cl.
CPC .................................. *H04W 24/10* (2013.01)

(58) Field of Classification Search
CPC ....... H04W 24/10; H04W 52/02; Y02D 30/70
See application file for complete search history.

(56) References Cited

U.S. PATENT DOCUMENTS

2018/0332532 A1 11/2018 Johansson et al.
2020/0314868 A1 10/2020 Tseng et al.
2021/0352507 A1* 11/2021 He .................... H04W 52/0232
2022/0053350 A1* 2/2022 Chen .................... H04B 17/309
2022/0312243 A1* 9/2022 He ........................ H04W 24/08
2024/0098538 A1* 3/2024 Koskinen .............. H04W 24/10

FOREIGN PATENT DOCUMENTS

CN 105898777 B 10/2019
CN 111278028 A 6/2020
CN 111294853 A 6/2020
CN 111615119 A 9/2020
CN 111641963 A 9/2020
(Continued)

OTHER PUBLICATIONS

"Discussion on RRM requirements maintenance of measurement relaxation for UE power saving," Proceedings of the 3GPP TSG-RAN WG4 Meeting # 96-e, OPPO, R4-2010704, Aug. 17, 2020, Electronic Meeting, 5 pages.
(Continued)

*Primary Examiner* — Christopher M Brandt
(74) *Attorney, Agent, or Firm* — McCoy Russell LLP

(57) ABSTRACT

A radio resource management (RRM) measurement relaxation and—information processing method and apparatus, a communication device and a storage medium. The RRM measurement relaxation method is performed by a connected UE. The RRM measurement relaxation method includes: determining an RRM measurement relaxation.

17 Claims, 4 Drawing Sheets

(56) References Cited

FOREIGN PATENT DOCUMENTS

| | | | |
|---|---|---|---|
| CN | 111757346 | A | 10/2020 |
| CN | 111787567 | A | 10/2020 |
| CN | 111800800 | A | 10/2020 |
| CN | 113038524 | A | 6/2021 |
| WO | 2020164720 | A1 | 8/2020 |
| WO | 2020200084 | A1 | 10/2020 |
| WO | 2020249199 | A1 | 12/2020 |

OTHER PUBLICATIONS

"Evaluation on the mobility impact for RRM measurement relaxation," Proceedings of the 3GPP TSG-RAN WG2 Meeting #106, Vivo, R2-1905962, May 13, 2019, Reno, Nevada, 12 pages.

"EDRX and RRM measurement relaxation for RedCap UE," Proceedings of the 3GPP TSG-RAN WG2 Meeting #112-e, Huawei, HiSilicon, R2-2009935, Nov. 3, 2020, Online Meeting, 7 pages.

* cited by examiner

RRM MEASUREMENT RELAXATION AND INFORMATION PROCESSING METHOD AND APPARATUS, DEVICE AND STORAGE MEDIUM

CROSS-REFERENCE TO RELATED APPLICATIONS

The present application is a U.S. National Stage of International Application No. PCT/CN2021/110659, entitled "RRM MEASUREMENT RELAXATION AND INFORMATION PROCESSING METHOD AND APPARATUS, DEVICE AND STORAGE MEDIUM", filed on Aug. 4, 2021, the contents of all of which are incorporated herein by reference in their entireties for all purposes.

BACKGROUND OF THE INVENTION

RRM measurement may be used for mobility management of user equipment (UE), for example, through RRM measurement, which cells can be accessed at the current location of the UE, or which cells are suitable for access are determined.

During RRM measurement of the UE, it is usually requested to monitor and measure a reference signal (RS) on a particular radio resource, and whether the UE needs to switch serving cells or continue to reside in a current cell is determined according to a measurement result of the reference signal.

SUMMARY OF THE INVENTION

The disclosure relates to but is not limited to the technical field of wireless communication, in particular to a radio resource management (RRM) measurement relaxation method and apparatus, an information processing method and apparatus, a communication device and a storage medium.

A first aspect of the examples of the disclosure provides an RRM measurement relaxation method. The method is performed by a connected UE and includes: determining an RRM measurement relaxation.

A second aspect of the examples of the disclosure provides an information processing method. The method is performed by a base station, and includes: receiving an RRM measurement result of connected UE after an RRM measurement relaxation.

A third aspect of the examples of the disclosure provides a communication device, including one or more processors, a transceiver, a memory and an executable program stored on the memory and capable of being operated by the one or more processors, when executed by the one or more processor, causes the one or more processors to perform steps of the RRM measurement relaxation method provided by the first aspect or perform steps of the information processing method provided by the second aspect above.

A fourth aspect of the examples of the disclosure provides a non-temporary computer storage medium which stores an executable program. The executable program can implement the RRM measurement relaxation method provided by the first aspect or perform steps of the information processing method provided by the second aspect above after being executed by one or more processors.

It is to be understood that the above general descriptions and later detailed descriptions are explanatory and illustrative, and cannot limit the examples of the disclosure.

BRIEF DESCRIPTION OF DRAWINGS

The accompanying drawings here are incorporated into the specification and constitute a part of the specification, showing the principles consistent with the examples of the disclosure and used together with the specification to explain the examples of the disclosure.

DETAILED DESCRIPTION OF THE INVENTION

Examples will be described in detail here, and instances of the examples are shown in the accompanying drawings. When the following description refers to the accompanying drawings, unless otherwise indicated, the same numbers in different drawings indicate the same or similar elements. The implementations described in the following examples do not represent all implementations consistent with the examples of the disclosure. Rather, they are merely instances of apparatuses and methods consistent with some aspects of the examples of the disclosure as detailed in the appended claims.

The terms used in the examples of the disclosure are merely for the purpose of describing specific examples, and are not intended to limit the examples of the disclosure. The singular forms "one", and "the" used in the examples of the disclosure and the appended claims are also intended to include the plural forms unless the context clearly indicates other meanings. It is also to be understood that the term "and/or" used here refers to and contains any or all possible combinations of one or more associated listed items.

It is to be understood that although the terms first, second, third, etc. may be used to describe various information in the examples of the disclosure, such information is not limited to these terms. These terms are merely used to distinguish the same type of information from each other. For example, without departing from the scope of the examples of the disclosure, first information may also be referred to as second information, and similarly, the second information may also be referred to as the first information. Depending on the context, the word "if" as used here may be interpreted as "at the time" or "when" or "upon determining that".

The UE has power consumption during RRM measurement, which will affect a standby duration of the UE to a certain extent. In view of this, when particular conditions are met, RRM measurement may be relaxed, and the power consumption of the UE may be lowered by relaxing the RRM measurement.

Examples of the disclosure provide an RRM measurement relaxation method and apparatus, an information processing method and apparatus, a communication device and a storage medium.

Figure 1:
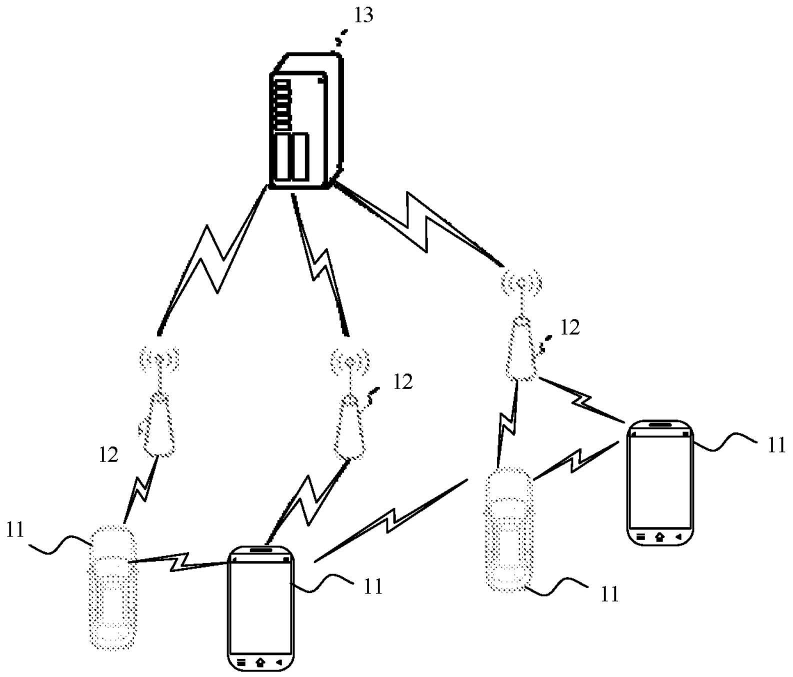
FIG. 1 is a schematic structural diagram of a wireless communication system illustrated according to an example.

Referring to FIG. 1, it shows a schematic structural diagram of a wireless communication system provided by an example of the disclosure. As shown in FIG. 1, the wireless communication system is a communication system based on a cellular mobile communication technology. The wireless communication system may include: a plurality of pieces of UE 11 and a plurality of access devices 12.

The UE 11 may refer to devices that provide a user with voice and/or data connectivity. The UE 11 may communicate with one or more core networks via a radio access network (RAN). The UE 11 may be internet of things UE, such as sensor devices, mobile phones (or called "cellular" phones) and computers with internet of things UE. For example, the UE 11 may be fixed, portable, pocket-size, handheld, computer built-in or vehicle-mounted apparatuses. For example, the UE 11 may be stations (STA), subscriber units, subscriber stations, mobile stations, mobiles, remote stations, access points, remote UE (remote terminals), access UE (access terminals), user terminals, user agents, user devices, or user equipment (UE). Or, the UE 11 may also be unmanned aircraft devices. Or, the UE 11 may also be vehicle-mounted devices, such as a trip computer with a wireless communication function, or a wireless communication device connected with an external trip computer. Or, the UE 11 may also be roadside devices, such as a street lamp, a signal light or other roadside devices with wireless communication functions.

The access devices 12 may be network side devices in the wireless communication system. The wireless communication system may be the 4th generation mobile communication (4G) system, also called a long term evolution (LTE) system; or, the wireless communication system may also be a 5G system, also called a new radio (NR) system or 5G NR system. Or, the wireless communication system may also be a next-generation system of the 5G system. An access network in the 5G system may be called a new generation-radio access network (NG-RAN). Or, it is an MTC system.

The access devices 12 may be evolved access devices (eNB) adopted in the 4G system. Or, the access devices 12 may also be access devices adopting centralized and distributed architectures (gNB) in the 5G system. When the access devices 12 adopt the centralized and distributed architectures, they typically each include a central unit (CU) and at least two distributed units (DUs). Protocol stacks of a packet data convergence protocol (PDCP) layer, a radio link control (RLC) layer and a media access control (MAC) layer are disposed in the central unit; and protocol stacks of physical (PHY) layers are disposed in the distributed units, and specific implementations of the access devices 12 are not limited in the example of the disclosure.

The access devices 12 and the UE 11 may establish wireless connection through wireless radio. In different implementations, the wireless radio is a wireless radio based on the 4G standard; or, the wireless radio is a wireless radio based on the 5G standard, such as new radio; or, the wireless radio may also be a wireless radio based on the next-generation mobile communication standard of 5G.

In some examples, the UE 11 may also establish end to end (E2E) connections, for example, vehicle to vehicle (V2V) communication, vehicle to infrastructure (V2I) communication and vehicle to pedestrian (V2P) communication in vehicle to everything (V2X) communication and other scenarios.

In some examples, the above wireless communication system may further contain a network management device 13.

The plurality of access devices 12 are connected with the network management device 13. The network management device 13 may be a core network device in the wireless communication system, for example, the network management device 13 may be a mobility management entity (MME) in an evolved packet core (EPC). Or, the network management device may also be other core network devices, such as a serving gate way (SGW), a public data network gate way (PGW), a policy and charging rules function (PCRF) or a home subscriber server (HSS), etc. The implementation form of the network management device 13 is not limited in the examples of the disclosure.

Figure 2:
FIG. 2 is a schematic diagram of a time sequence for e-DRX function execution illustrated according to an example.

As shown in FIG. 2, an RRM measurement relaxation method is performed by a connected UE, and includes:

S110: an RRM measurement relaxation is determined.

The UE includes but is not limited to using NR UE. The NR UE may be UE using NR carriers. The UE is in a connected state, and the connected state is also called radio resource control (RRC) connection.

In the example of the disclosure, the UE is in the connected state which may also be called an RRC connected state.

The UE may be various types of UE, for example, the UE may be a mobile phone, a tablet computer, a wearable device, a smart home device, a smart office device or a vehicle-mounted device.

In the example of the disclosure, S110 is that: RRM measurement is relaxed when it is determined that the UE is in the connected state.

As such, it is equivalent that the connected UE may also relax RRM measurement. At least the following characteristics are present before and after the RRM measurement relaxation: the frequency of the RRM measurement after relaxation is lower than the frequency of the RRM measurement before relaxation, so that the power consumption of the UE produced by the RRM measurement may be lowered, thus prolonging a standby duration of the UE.

According to the technical solution provided by the examples of the disclosure, compared to the situation that an RRM measurement relaxation is mainly used for non-connected UE, in the examples of the disclosure, the RRM measurement relaxation is further used for the connected UE, so that RRM measurement of the UE may also be reduced through the RRM measurement relaxation, thus reducing the power consumption of the connected UE and prolonging a standby duration of the UE.

Figure 3:
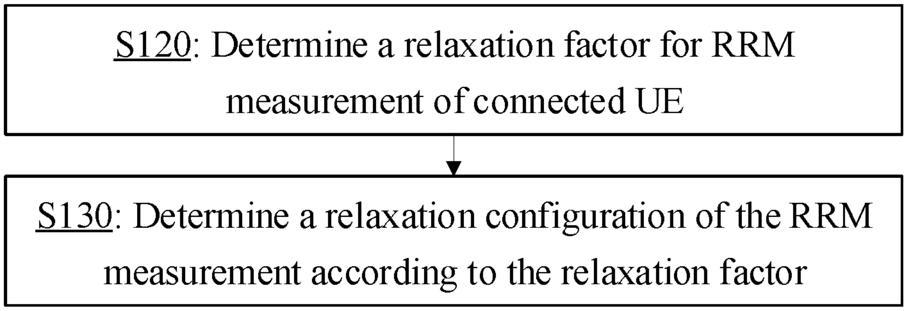
FIG. 3 is a schematic interaction diagram of a core network configuring an idle state e-DRX function illustrated according to an example.

As shown in FIG. 3, an example of the disclosure provides an RRM measurement relaxation method, which may include:

S120: a relaxation factor for the RRM measurement of the connected UE is determined; and S130: a relaxation configuration of the RRM measurement is determined according to the relaxation factor.

For example, when it is determined to relax RRM measurement of the connected UE, the connected UE will determine the relaxation factor for the RRM measurement of the UE and then determine the relaxation configuration of the RRM measurement based on the relaxation factor.

For another example, in some examples, when the connected UE has not determined whether to relax the RRM measurement, the relaxation factor for the RRM measurement of the connected UE may be determined in advance and then the relaxation configuration of the RRM measurement is determined according to the relaxation factor. As such, when it is determined to relax the RRM measurement of the connected UE, the RRM measurement relaxation may be performed immediately according to the pre-determined relaxation configuration for the RRM measurement relaxation of the connected UE.

The relaxation factor here may be a parameter of measuring a relaxation degree. For example, the relaxation factor may be a relaxation coefficient. The relaxation coefficient is a positive number not less than 1, and may be used as a coefficient of various cycles associated with the RRM measurement before relaxation to solve various cycles associated with the RRM measurement after relaxation, and for another example, the relaxation factor may also be a duration value indicating stopping RRM measurement and the like.

Thus, in some examples, the RRM measurement relaxation method shown in FIG. 3 may be performed independently or performed in combination with the RRM measurement relaxation method shown in FIG. 2.

In some examples, the relaxation configuration indicates at least one of the following:

- a relaxation manner configuration, indicating a relaxation manner of the RRM measurement; or
- a relaxation measurement configuration, indicating a measurement configuration after the RRM measurement relaxation.

The relaxation manner configuration indicates which manner is adopted to relax the RRM measurement.

In the example of the disclosure, the relaxation manner configuration indicates at least two relaxation manners, one is stopping the RRM measurement to achieve maximum relaxation of the RRM measurement, and the other is lowering a measurement frequency of the RRM measurement, namely increasing various cycles in the RRM measurement process, thus achieving increase on the dimension of a frequency domain.

The relaxation measurement configuration indicates a measurement configuration of the RRM measurement after relaxation. For example, for maximum relaxation of stopping the RRM measurement, a duration of stopping the RRM measurement, a time period of stopping the RRM measurement, and whether partial measurement or all measurement in the RRM measurement is stopped, etc. For increasing various cycles associated with the RRM measurement, cycles after relaxation, etc. may be determined by the relaxation measurement configuration.

The RRM measurement includes: RRM measurement on a serving cell and/or RRM measurement on a neighboring cell. A part of RRM measurement may be conducted in a way of stopping measurement, and a part of RRM measurement is achieved in a way of increasing cycles.

In one example, the relaxation manner includes: increasing a cycle associated with the RRM measurement; and/or stopping the RRM measurement. Which manner is specifically adopted for different RRM measurements specifically may be determined according to communication requirements of the UE and network side configurations, etc.

In one example, S130 may include at least one of:

- upon determining that the relaxation manner is increasing the cycle associated with the RRM measurement, obtaining an associated cycle after the RRM measurement relaxation according to the relaxation factor; or,
- upon determining that the relaxation manner is stopping the RRM measurement, determining a duration of stopping the RRM measurement according to the relaxation factor.

In the example of the disclosure, the cycle associated with the RRM measurement will be increased and/or the duration of stopping the RRM measurement will be determined according to the relaxation factor.

The cycle associated with the RRM measurement includes at least one of the following:

- a recognition cycle of RRM measurement on a serving cell;
- a measurement cycle of RRM measurement on a serving cell;
- a recognition cycle of RRM measurement on a neighboring cell; or
- a measurement cycle of RRM measurement on a neighboring cell.

In some examples, the serving cell may include: a primary cell and/or a secondary cell.

The recognition cycle includes: a cycle of recognizing a cell through a cell identity and the like carried by a reference signal sent by the cell, and performing measurement on the cell.

The measurement cycle is a cycle mainly used for measuring the recognized cell.

The neighboring cell includes but is not limited to: an intra-frequency neighboring cell, an inter-frequency neighboring cell and/or an inter-system neighboring cell.

In some examples, the cycle associated with the RRM measurement may further include: a measurement cycle of RRM measurement on the secondary cell, for example, a measurement cycle of RRM measurement on a deactivated secondary cell.

When the RRM measurement relaxation of the connected UE is performed, increasing of any one or more of the above cycles associated with the RRM measurement may be performed.

In some examples, the upon determining that the relaxation manner is increasing the cycle associated with the RRM measurement, obtaining an associated cycle after the RRM measurement relaxation according to the relaxation factor includes:

- determining the relaxation factor for the RRM measurement of the connected UE; and
- obtaining an associated cycle after the RRM measurement relaxation by increasing the associated cycle before the RRM measurement relaxation according to the relaxation factor.

UE has a connected state and a non-connected state, while the non-connected state may include: an idle state and/or an inactive state. In the example of the disclosure, the relaxation factor for the non-connected UE may be independent of the relaxation factor for the connected UE. The relaxation factor for the connected UE may be equal to or not equal to the relaxation factor for the non-connected UE.

Thus, when a relaxed RRM measurement configuration in the relaxation measurement configuration is determined, the relaxation factor will be determined first, and then the cycle associated with the RRM measurement is increased based on the relaxation factor.

In one example, the relaxation factor of the RRM measurement for the connected UE is smaller than the relaxation factor of the RRM measurement for a non-connected UE. Considering that the UE in the connected state may have more business requirements and/or cell switching and/or reselecting requirements than the UE in the non-connected state, in view of this, even if the RRM measurement of the connected UE is relaxed, a relaxation degree may be lower than a degree of relaxing the RRM measurement of the non-connected UE, so that the relaxation factor of the connected UE may be set to be smaller than the relaxation factor of the RRM measurement for a non-connected UE, so as to be adaptive to a current network connecting state of the UE.

In some examples, the relaxation factor includes at least one of the following:

- a first factor for relaxing the RRM measurement on a serving cell;
- a second factor for relaxing RRM measurement on an intra-frequency neighboring cell;
- a third factor for relaxing RRM measurement on an inter-frequency neighboring cell;
- a fourth factor for relaxing RRM measurement on an inter-system neighboring cell; or
- a fifth factor for relaxing RRM measurement on a deactivated secondary cell; where
- any two of the first factor, the second factor, the third factor, the fourth factor and the fifth factor are mutually independent.

These relaxation factors are mutually independent, and thus values of these factors may be determined respectively. Thus, in some examples, any two of the first factor, the second factor, the third factor, the fourth factor and the fifth factor may be equal or not equal.

In some examples, considering UE cell reselecting and/or cell switching, from the first factor to the fifth factor, the first factor is the minimum, while the fifth factor is the maximum. Setting the first factor to be the minimum is equivalent to that the RRM measurement relaxation of the serving cell (particular the primary cell) is the minimum, as a result, it is convenient for the connected UE to timely find out whether a current serving cell of the UE is suitable for continued residence according to a measurement result of the RRM measurement, and to timely perform cell switching and/or cell reselecting if the cell is not suitable for continued residence.

Any two of the second factor to the fourth factor may be equal or not equal. For example, the first factor may be smaller than the second factor, the second factor may be smaller than the third factor, the third factor may be greater than or equal to the fourth factor, and the fourth factor may be smaller than or equal to the second factor, thus reducing inter-frequency switching and/or inter-system switching of the UE.

For example, S130 may include: upon determining that the relaxation manner is increasing the cycle associated with the RRM measurement, obtaining the associated cycle after the RRM measurement relaxation based on a product of the relaxation factor and an associated cycle before the RRM measurement relaxation.

Through product operation, a relaxation factor not smaller than 1 may be used to rapidly determine the cycle associated with the RRM measurement after relaxation.

In some examples, the stopping the RRM measurement includes at least one of the following:

- stopping the RRM measurement on a serving cell;
- stopping the RRM measurement on a secondary cell;
- stopping the RRM measurement on an intra-frequency neighboring cell;
- stopping the RRM measurement on an inter-frequency neighboring cell; or
- stopping the RRM measurement on an inter-system neighboring cell.

Here, stopping the RRM measurement on a serving cell may include: stopping RRM measurement on a primary cell (Pcell).

In some cases, the serving cell may include: the primary cell and the secondary cell. The secondary cell here may also be divided into: a primary secondary cell (PScell) and a secondary cell (Scell).

If one piece of UE does not have dual connection, that is, only one serving cell exists and there is no serving cell constituted by a secondary cell, the serving cell at the moment is a cell where the UE resides currently.

Here, stopping the RRM measurement on the secondary cell may include: stopping RRM measurement on the deactivated secondary cell.

In some examples, the UE may operate at a plurality of frequency bands, and a current operating frequency band of the UE may also be one or more. In this case, different relaxation factors may be set for different frequency bands to control the relaxation of the UE for RRM measurement at the corresponding frequency bands.

For example, according to using frequencies of respective frequency bands of the UE, a relaxation factor of a frequency band with a high using frequency may be set to be smaller than a relaxation factor of a frequency band with a low using frequency, so that the UE still have more opportunities to access or use its own high-using-frequency or habitual frequency bands based on relaxed RRM measurement.

For instance, the UE may operate both at RF1 and RF2, and different relaxation factors may be set for RF1 and RF2, so that an RRM measurement relaxation for RF1 and an RRM measurement relaxation for RF2 of the connected UE are controlled respectively.

Thus, in some examples, different frequency bands have independent relaxation factors.

In some examples, the determining a relaxation factor for the RRM measurement of the connected UE includes:

- determining a value of the relaxation factor according to a configuration situation of a discontinuous reception DRX cycle of the connected UE.

Some UE is configured with a DRX cycle, some UE is not configured with a DRX cycle, in this case, the value of the relaxation factor may be determined according to the configuration situation of the DRX cycle of the UE, as a result, the relaxation measurement configuration is made to adapt to whether the UE has a DRX cycle or a configuration of the DRX cycle, so that power consumption produced by the fact that the UE exits sleeping and enters awakening due to RRM measurement within a sleeping period of the DRX cycle is reduced, thus further saving the power consumption of the UE.

The determining a value of the relaxation factor according to a configuration situation of a discontinuous reception DRX cycle of the connected UE includes one of the following:

- upon determining that the connected UE is not configured with a DRX cycle, determining that a value of the relaxation factor is a first value;
- upon determining that the connected UE is configured with a DRX cycle and the DRX cycle is greater than a first duration, determining that a value of the relaxation factor is a second value; or
- upon determining that the connected UE is configured with a DRX cycle and the DRX cycle is less than or equal to the first duration, determining that a value of the relaxation factor is a third value.

If the UE is not configured with a DRX cycle, it indicates that the UE will not perform a DRX mechanism of periodic switching between a sleeping state and an awakening state, and at the moment, it may be determined that the value of the relaxation factor is the first value.

If the UE is configured with a DRX cycle, it indicates that the connected UE will perform the DRX mechanism according to the DRX cycle, for example, periodic switching between a sleeping state and an activated state is performed according to the DRX cycle.

At the moment, S120 may include: determining the relaxation factor according to the DRX cycle of the connected UE.

It may be understood that the determining the relaxation factor according to the DRX cycle of the connected UE may include:

upon determining that the connected UE is configured with a DRX cycle and the DRX cycle is greater than the first duration, determining that the value of the relaxation factor is the second value; or upon determining that the connected UE is configured with a DRX cycle and the DRX cycle is less than or equal to the first duration, determining that the value of the relaxation factor is the third value.

In some examples, the first duration may be any predetermined value, or any value designated at a network side or designated by a protocol.

For example, the first duration may be: 320 ms or 160 ms or 240 ms or 400 ms or other values.

If the DRX cycle of the connected UE is greater than the first duration, the value of the relaxation factor is determined as the second value, and if the DRX cycle of the connected UE is less than or equal to the first duration, the value of the relaxation factor is determined as the third value.

If the DRX cycle of the connected UE is greater than the first duration, compared to the DRX cycle of the connected UE being less than or equal to the first duration, the connected UE will switch between sleeping and awakening with a lower frequency.

In the example of the disclosure, the first value, the second value and the third value may be mutually independent, that is, any two of the first value to the third value may be equal or not equal. As such, the relaxation factor may be determined according to whether the connected UE is configured with a DRX cycle and according to the duration of the DRX cycle in a case of configuring the DRX cycle. The RRM measurement relaxation is performed according to such relaxation factor, so that the reasonable RRM measurement relaxation of the connected UE under different states may be realized.

Figure 4:
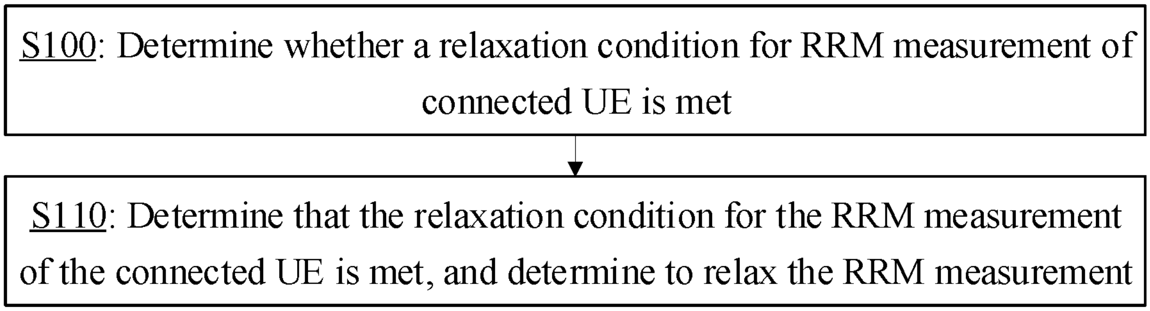
FIG. 4 is a schematic flow diagram of an RRM measurement relaxation method illustrated according to an example.

In some examples, as shown in FIG. 4, the method further includes:

S100: whether a relaxation condition for the RRM measurement of the connected UE is met is determined.

S110 may include: determining that the relaxation condition for the RRM measurement of the connected UE is met, and determining to relax the RRM measurement.

In some examples, the connected UE may or may not perform the RRM measurement relaxation.

When it is determined that a current state of the UE meets the relaxation condition for the RRM measurement of the connected UE, it is determined to relax the RRM measurement of the connected UE.

In one example, when it is determined that the current state of the UE does not meet the relaxation condition for the RRM measurement of the connected UE, it is determined not to relax the RRM measurement of the connected UE.

The relaxation condition for the RRM measurement of the connected UE here may be the same as or different from a relaxation condition for RRM measurement of the non-connected UE.

If the relaxation condition for the RRM measurement of the connected UE is the same as the relaxation condition for the RRM measurement of the non-connected UE, the connected UE and the non-connected UE share the same relaxation condition for RRM measurement.

In one example, considering that the connected UE may have more business transmission requirements, the relaxation condition for the RRM measurement of the connected UE may be stricter than the relaxation condition for the RRM measurement of the non-connected UE.

For example, the relaxation condition involves a moving rate of the UE, then a rate threshold for the connected UE may be smaller than a rate threshold for the non-connected UE.

For another example, the relaxation condition is determined through a measured value of signal measurement of the UE on a serving cell, and a duration corresponding to the situation that a measured value of the connected UE for a reference signal of the serving cell is greater than a preset threshold may be longer.

The above is examples, and the specific implementation is not limited to the above examples.

In some examples, the determining whether a relaxation condition for the RRM measurement of the connected UE is met includes at least one of the following:

determining whether a motion state of the connected UE meets a stationary condition;

or determining whether the connected UE is located in a non-marginal area of a serving cell.

UE has mobility, the UE itself contains some sensors, and these sensors may detect a moving rate of the UE. When the moving rate of the UE is less than a stationary threshold, it may be considered that the motion state of the UE meets a stationary condition, otherwise it may be considered that the motion state of the UE does not meet the stationary condition.

Generally, the power of emitting a reference signal of the serving cell of the UE is maintained stable, the UE will measure the reference signal issued by the serving cell, the reference signal includes but is not limited to a synchronization signal and/or a channel state detection reference signal, etc., and the UE will obtain a measured value of the reference signal through measurement. The measured value includes but is not limited to: reference signal received power (RSRP) and/or reference signal received quality (RSRQ). If the measured value of the UE for the reference signal of the serving cell is maintained at a very small fluctuation amplitude all the time, it may be considered that the UE does not move or moves by a small distance, thus meeting the stationary condition.

The serving cell may be divided into a non-marginal area and a marginal area according to a distance to a base station or a distance between the UE and a center point of the serving cell. The marginal area is also called a cell edge, and the non-marginal area is also called a center area. The marginal area is located in the periphery of the non-marginal area.

Whether the UE is located in the non-marginal area may be determined according to positioning information of the UE or the measured value of the UE for the reference signal of the serving cell, if the measured value is greater than a certain threshold, it indicates that the distance between the UE and a base station at the center position of the serving cell is quite small, and it may also be determined that the UE is located in the non-marginal area of the serving cell.

In some examples, the determining a relaxation factor for the RRM measurement of the connected UE includes:

determining a relaxation factor for the RRM measurement of the connected UE according to the met relaxation condition.

For example, the determining the relaxation factor for the RRM measurement of the connected UE according to the met relaxation condition includes at least one of the following:

determining the relaxation factor when the connected UE meets the stationary condition alone;

determining the relaxation factor when the connected UE meets being located in the non-marginal area of the serving cell alone; or determining the relaxation factor when the connected UE meets the stationary condition and meets being located in the non-marginal area of the serving cell at the same time.

If the UE meets the stationary condition, it indicates that the UE is currently in a completely stationary state or has a very low moving speed, the probability of continuing to residing at the current serving cell is very high, and thus the RRM measurement may be relaxed properly.

If the UE is located in the non-marginal area of the serving cell, even if the UE moves, it may experience a measurement cycle before leaving the serving cell, and thus the RRM measurement may be relaxed properly.

In one example, different relaxation conditions correspond to relaxation factors of different values.

If the connected UE meets different relaxation conditions, it is determined that there are different relaxation factors, the relaxation factor determined in this way is adaptive to an RRM measurement relaxation situation which the UE meets currently, and then power consumption conservation of the UE and RRM measurement needed for mobility management can be well balanced.

For example, the relaxation factor when the connected UE currently meets the stationary condition alone may be slightly greater than the relaxation factor when the UE currently meets being located in the non-marginal area of the serving cell alone. If the UE is located in the serving cell currently but the UE is moving at a relatively high speed, the UE also needs to switch to other cells based on the RRM measurement after several RRM measurement cycles, and thus, in this case, it may be more proper that the relaxation degree of the RRM measurement of the UE is lower.

For another example, if the relaxation factor when the connected UE meets the stationary condition and meets being located in the non-marginal area of the serving cell at the same time is greater than the relaxation factor when the connected UE meets the stationary condition alone and the relaxation factor when the connected UE meets being located in the non-marginal area of the serving cell alone. Since the connected UE meets the stationary condition and is located in the non-marginal area of the serving cell at the same time, it indicates that the probability of continuing to residing in the serving cell of the UE is very high, so that measurement of the serving cell and/or the neighboring cell may be relaxed as far as possible, thus reducing the power consumption produced by RRM measurement of the UE as much as possible.

An example of the disclosure provides an RRM measurement method, which may include: introducing an RRM measurement relaxation for connected UE.

The RRM measurement relaxation is performed for the connected UE by using a cycle expanding manner or a measurement stopping manner.

A relaxation factor for cycle expansion of the connected UE may be different from a relaxation factor of an idle UE.

As an example, a relaxation factor of a connected user is b, b and a may be mutually independent, for example, b and a may be the same or different, and in some examples, b is less than a.

As an example, the connected UE is relaxed for 0.5 hour when meeting a measurement stopping condition, and the idle UE is relaxed for 1 hour when meeting a measurement stopping condition. The stopping condition at the moment is one of the aforementioned relaxation conditions.

Different relaxation factors or measurement stopping durations may be introduced for RRM measurement on an intra-frequency neighboring cell and RRM measurement on an inter-frequency neighboring cell.

As an example, a relaxation factor of the RRM measurement on the intra-frequency neighboring cell is b1; and a relaxation factor of RRM measurement on the inter-frequency neighboring cell is b2.

A new relaxation factor or measurement stopping duration may be introduced for an inter-system cell.

As an example, a relaxation factor of RRM measurement on the inter-system neighboring cell is c.

A new relaxation factor may be adopted for a deactivated Scell.

As an example, a relaxation factor of measurement on the deactivated Scell is c.

A different relaxation factor may be adopted for the situation where a DRX cycle is not configured or different DRX cycles are configured.

As an example:

if the connected UE is not configured with a DRX cycle, the relaxation factor of the connected UE is x. If the connected UE is configured with a DRX cycle, the relaxation factor will be determined further according to the DRX cycle.

For example, the DRX cycle ≤320 ms: the relaxation factor of the connected UE is y; and the DRX cycle >320 ms: the relaxation factor of the connected UE is z.

Different relaxation factors may be introduced for RF1 and RF2.

As an example:

RF1: the relaxation factor of the connected UE is m;

RF2: the relaxation factor of the connected UE is n.

In some examples, the relaxation factor may be obtained by directly multiplying a coefficient based on an original formula.

In some examples, a relaxation degree of the cycle expansion manner for the connected UE may be carried out under different relaxation conditions:

relaxation condition a): the connected UE uses the RRM measurement relaxation when meeting a stationary condition; and relaxation condition b): the connected UE uses the RRM measurement relaxation when meeting the stationary condition and a non-cell-edge condition.

In some examples, relaxation factors used under the conditions a) and b) may be the same or different.

As a preferred example: a larger relaxation factor or measurement stopping duration will be used under the condition b).

Figure 5:
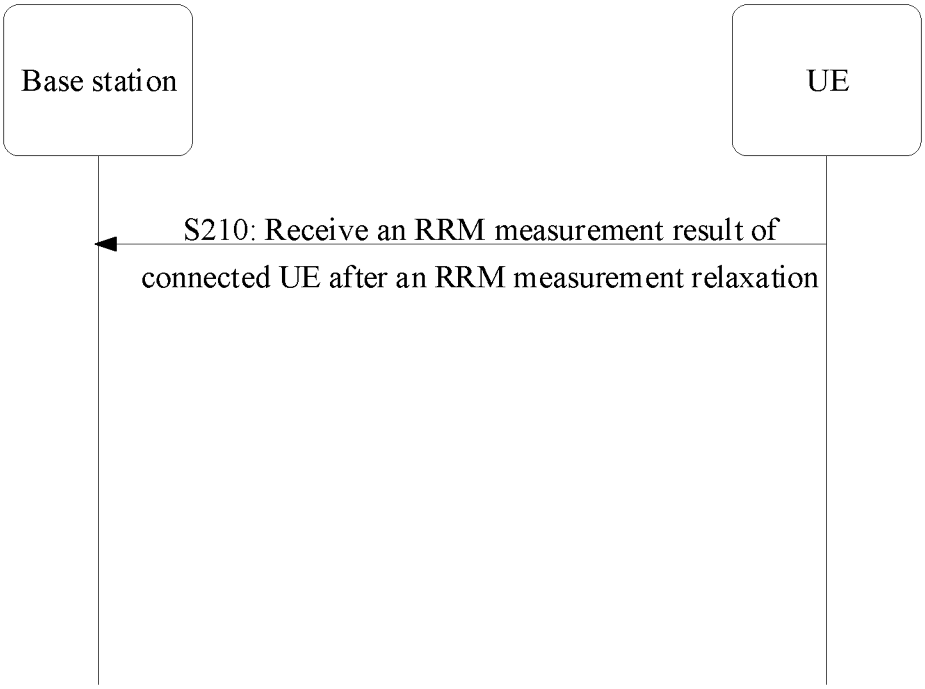
FIG. 5 is a schematic flow diagram of an information processing method illustrated according to an example.

As shown in FIG. 5, an example of the disclosure provides an information processing method, which may be performed by a base station, and may include:

S210: an RRM measurement result of connected UE after an RRM measurement relaxation is received.

In the example of the disclosure, the connected UE will also perform the RRM measurement relaxation according to an RRM measurement relaxation mechanism, and thus an RRM measurement result received at a base station side may be the measurement result of the connected UE after the RRM measurement relaxation. A measurement cycle, an evaluation cycle and the like corresponding to the measurement result at the moment are prolonged.

In some examples, the base station may send to the UE configuration information of the RRM measurement relaxation, and the configuration information may be used for the connected UE to determine a measurement configuration of RRM measurement after relaxation. For example, the configuration information may at least indicate parameters such as a relaxation manner and/or a relaxation factor. Certainly, the above are examples, and the specific implementation is not limited to the above examples. For instance, in some cases, the configuration information may be written into a communication protocol, such that the UE may know the above configuration information according to the communication protocol.

In some examples, the RRM measurement is performed according to a relaxation configuration. The relaxation configuration indicates at least one of the following: a relaxation manner configuration, indicating a relaxation manner of the RRM measurement; or a relaxation measurement configuration, indicating a measurement configuration after the RRM measurement relaxation.

The relaxation manner configuration indicates which manner is adopted to relax the RRM measurement. In the example of the disclosure, the relaxation manner configuration indicates at least two relaxation manners, one is stopping the RRM measurement to achieve maximum relaxation of the RRM measurement, and the other is lowering a measurement frequency of the RRM measurement, namely increasing various cycles in the RRM measurement process, thus achieving increase on the dimension of a frequency domain.

The relaxation measurement configuration indicates the measurement configuration of the RRM measurement after relaxation. For example, for maximum relaxation of stopping the RRM measurement, a duration of stopping the RRM measurement, a time period of stopping the RRM measurement, and whether partial measurement or all measurement in the RRM measurement is stopped, etc. For increasing various cycles associated with the RRM measurement, cycles after relaxation, etc. may be determined by the relaxation measurement configuration.

The RRM measurement includes: RRM measurement on a serving cell and/or RRM measurement on a neighboring cell. A part of RRM measurement may be conducted in a way of stopping measurement, and a part of RRM measurement is achieved in a way of increasing cycles.

In some examples, the relaxation manner includes at least one of:

increasing a cycle associated with the RRM measurement; or stopping the RRM measurement.

The cycle associated with the RRM measurement includes at least one of the following:

a recognition cycle of RRM measurement on a serving cell;

a measurement cycle of RRM measurement on the serving cell;

a recognition cycle of RRM measurement on a neighboring cell; or a measurement cycle of RRM measurement on the neighboring cell.

In some examples, the serving cell may include: a primary cell and/or a secondary cell.

The recognition cycle includes: a cycle of recognizing a cell through a cell identity and the like carried by a reference signal sent by the cell, and performing measurement on the cell.

The measurement cycle is a cycle mainly used for measuring the recognized cell.

The neighboring cell includes but is not limited to: an intra-frequency neighboring cell, an inter-frequency neighboring cell and/or an inter-system neighboring cell.

In some examples, the cycle associated with the RRM measurement may further include: a measurement cycle of RRM measurement on the secondary cell, for example, a measurement cycle of RRM measurement on a deactivated secondary cell.

When the RRM measurement relaxation of the connected UE is performed, increasing of any one or more of the above cycles associated with the RRM measurement may be performed.

In some examples, the relaxation configuration of the RRM measurement is determined according to a relaxation factor.

The relaxation factor may be a multiplying factor of increasing the cycle associated with the RRM measurement or a stopping duration of stopping the RRM measurement.

In some examples, the cycle associated with the RRM measurement includes at least one of the following:

a recognition cycle of RRM measurement on the serving cell;

a measurement cycle of RRM measurement on the serving cell;

a recognition cycle of RRM measurement on the neighboring cell; or a measurement cycle of RRM measurement on the neighboring cell.

In some examples, the relaxation factor of the RRM measurement on the connected UE is smaller than a relaxation factor of the RRM measurement on a non-connected UE.

The relaxation factor of the connected UE being smaller than the relaxation factor of the non-connected UE may meet business abruptness and business transmission requirements of the connected UE under a current state, thus being better adaptive to the current state of the UE.

In some examples, the relaxation factor includes at least one of the following:

a first factor for relaxing the RRM measurement on the serving cell;

a second factor for relaxing RRM measurement on the intra-frequency neighboring cell;

a third factor for relaxing RRM measurement on the inter-frequency neighboring cell;

a fourth factor for relaxing RRM measurement on the inter-system neighboring cell; or a fifth factor for relaxing RRM measurement on a deactivated secondary cell; where any two of the first factor, the second factor, the third factor, the fourth factor and the fifth factor are mutually independent.

In some examples, the stopping the RRM measurement includes at least one of the following:

stopping the RRM measurement on the serving cell;

stopping the RRM measurement on the secondary cell;

stopping the RRM measurement on the intra-frequency neighboring cell;

stopping the RRM measurement on the inter-frequency neighboring cell; or stopping the RRM measurement on the inter-system neighboring cell.

In some examples, different frequency bands have independent relaxation factors. For instance, some UE supports RF1 and RF2 at the same time, and then RRM measurement relaxations on RF1 and RF2 when such UE is in a connected state may be determined based on mutually independent relaxation factors respectively.

In some examples, a value of the relaxation factor is determined according to a configuration situation of a discontinuous reception DRX cycle of the connected UE.

In some examples, the connected UE is not configured with a DRX cycle, and the value of the relaxation factor is a first value; or, the connected UE is configured with a DRX cycle and the DRX cycle is greater than a first duration, and the value of the relaxation factor is a second value; or, the connected UE is configured with a DRX cycle and the DRX cycle is less than or equal to the first duration, and the value of the relaxation factor is a third value.

In some examples, the relaxation factor is determined by the connected UE according to a met relaxation condition.

In some examples, different relaxation conditions correspond to relaxation factors of different values.

In some examples, the relaxation condition of the RRM measurement includes at least one of the following:

determining whether a motion state of the connected UE meets a stationary condition; or determining whether the connected UE is located in a non-marginal area of a serving cell.

If the connected UE meets the stationary condition and is located in the non-marginal area of the serving cell at the same time, the connected UE may have a larger relaxation factor compared to meeting the stationary condition alone or meeting being located in the non-marginal area alone, so that a greater degree of RRM measurement relaxation is achieved, and the power consumption of the RRM measurement of the UE is reduced as much as possible.

Figure 6:
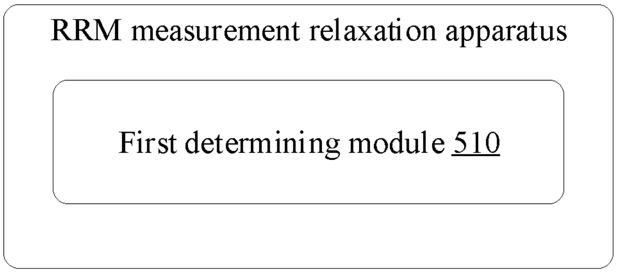
FIG. 6 is a schematic structural diagram of an RRM measurement relaxation apparatus illustrated according to an example.

As shown in FIG. 6, an example of the disclosure provides an RRM measurement relaxation apparatus, which is contained in a connected UE and includes:

a first determining module 510, configured to determine an RRM measurement relaxation.

In some examples, the first determining module 510 may be a program module. The program module, after being executed by a processor, can determine the RRM measurement relaxation.

In some other examples, the first determining module 510 may be a software-hardware combined module, which includes but is not limited to: various programmable arrays. The programmable arrays include but are not limited to: a field programmable array and a complex programmable array.

In yet some examples, the first determining module 510 may be a pure-hardware module which includes but is not limited to: an application-specific integrated circuit.

In some examples, the apparatus further includes:

a second determining module, configured to determine a relaxation factor for the RRM measurement of the connected UE; and a third determining module, configured to determine a relaxation configuration of the RRM measurement according to the relaxation factor.

In some examples, the relaxation configuration indicates at least one of the following:

a relaxation manner configuration, indicating a relaxation manner of the RRM measurement; or a relaxation measurement configuration, indicating a measurement configuration after the RRM measurement relaxation.

In some examples, the relaxation manner includes at least one of:

increasing a cycle associated with the RRM measurement; or stopping the RRM measurement.

In some examples, the third determining module is configured to, obtain an associated cycle after the RRM measurement relaxation according to the relaxation factor upon determining that the relaxation manner is increasing the cycle associated with the RRM measurement; or determine a duration of stopping the RRM measurement according to the relaxation factor upon determining that the relaxation manner is stopping the RRM measurement.

In some examples, the cycle associated with the RRM measurement includes at least one of the following:

a recognition cycle of RRM measurement on a serving cell;

a measurement cycle of RRM measurement on a serving cell;

a recognition cycle of RRM measurement on a neighboring cell; or a measurement cycle of RRM measurement on a neighboring cell.

In some examples, the third determining module is configured to determine the relaxation factor for the RRM measurement of the connected UE; and obtain an associated cycle after the RRM measurement relaxation by increasing the associated cycle before the RRM measurement relaxation according to the relaxation factor.

In some examples, the relaxation factor of the RRM measurement on the connected UE is smaller than a relaxation factor of the RRM measurement on a non-connected UE.

In some examples, the relaxation factor includes at least one of the following:

a first factor for relaxing the RRM measurement on a serving cell;

a second factor for relaxing RRM measurement on an intra-frequency neighboring cell;

a third factor for relaxing RRM measurement on an inter-frequency neighboring cell;

a fourth factor for relaxing RRM measurement on an inter-system neighboring cell; or a fifth factor for relaxing RRM measurement on a deactivated secondary cell; where any two of the first factor, the second factor, the third factor, the fourth factor and the fifth factor are mutually independent.

In some examples, the stopping the RRM measurement includes at least one of the following:

stopping the RRM measurement on a serving cell;

stopping the RRM measurement on a secondary cell;

stopping the RRM measurement on an intra-frequency neighboring cell;

stopping the RRM measurement on an inter-frequency neighboring cell; or stopping the RRM measurement on an inter-system neighboring cell.

In some examples, different frequency bands have independent the relaxation factors.

In some examples, the third determining module is configured to, obtain the associated cycle after the RRM measurement relaxation based on a product of the relaxation factor and an associated cycle before the RRM measurement relaxation upon determining that the relaxation manner is increasing the cycle associated with the RRM measurement.

In some examples, the relaxation factor of the RRM measurement on the RRM measurement is smaller than the relaxation factor of the RRM measurement on the non-connected UE.

In some examples, the second determining module is configured to determine a value of the relaxation factor according to a configuration situation of a discontinuous reception DRX cycle of the connected UE.

In some examples, the second determining module is configured to execute at least one of the following:

upon determining that the connected UE is not configured with a DRX cycle, determining that a value of the relaxation factor is a first value;

upon determining that the connected UE is configured with a DRX cycle and the DRX cycle is greater than a first duration, determining that a value of the relaxation factor is a second value; or upon determining that the connected UE is configured with a DRX cycle and the DRX cycle is less than or equal to the first duration, determining that a value of the relaxation factor is a third value.

In some examples, the apparatus further includes:

a fourth determining module, configured to determine whether a relaxation condition for the RRM measurement of the connected UE is met.

The first determining module 510 is configured to determine that the relaxation condition for the RRM measurement of the connected UE is met, and determine to relax the RRM measurement.

In some examples, the fourth determining module is configured to execute at least one of the following:

determining whether a motion state of the connected UE meets a stationary condition; or determining whether the connected UE is located in a non-marginal area of a serving cell.

In some examples, the second determining module is configured to determine a relaxation factor for the RRM measurement of the connected UE according to the met relaxation condition.

Figure 7:
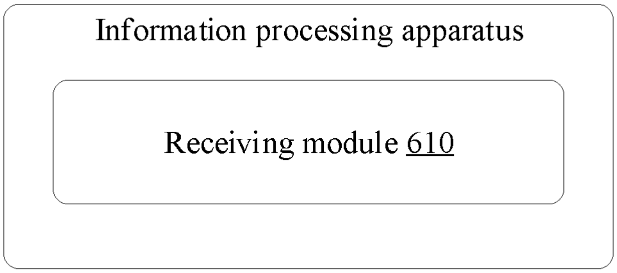
FIG. 7 is a schematic structural diagram of an information processing apparatus illustrated according to an example.

As shown in FIG. 7, an example of the disclosure provides an information processing apparatus, including:

a receiving module 610, configured to receive an RRM measurement result of connected UE after an RRM measurement relaxation.

The information processing apparatus provided by the example of the disclosure may be contained in a base station.

In some examples, the receiving module 610 may be a program module. The program module, after being executed by a processor, can receive an RRM measurement result of RRM measurement of the connected UE after relaxation.

In some other examples, the receiving module 610 may be a software-hardware combined module, which includes but is not limited to: various programmable arrays. The programmable arrays include but are not limited to: a field programmable array and a complex programmable array.

In yet some examples, the receiving module 610 may be a pure-hardware module which includes but is not limited to: an application-specific integrated circuit.

In some examples, the RRM measurement is performed according to a relaxation configuration.

The relaxation configuration indicates at least one of the following:

a relaxation manner configuration, indicating a relaxation manner of the RRM measurement; or a relaxation measurement configuration, indicating a measurement configuration after the RRM measurement relaxation.

In some examples, the relaxation manner includes at least one of:

increasing a cycle associated with the RRM measurement; or stopping the RRM measurement.

In some examples, the relaxation configuration of the RRM measurement is determined according to a relaxation factor.

In some examples, the cycle associated with the RRM measurement includes at least one of the following:

a recognition cycle of RRM measurement on a serving cell;

a measurement cycle of RRM measurement on a serving cell;

a recognition cycle of RRM measurement on a neighboring cell; or a measurement cycle of RRM measurement on a neighboring cell.

In some examples, the relaxation factor of the RRM measurement for the connected UE is smaller than a relaxation factor of the RRM measurement for a non-connected UE.

In some examples, the relaxation factor includes at least one of the following:

a first factor for relaxing the RRM measurement on a serving cell;

a second factor for relaxing RRM measurement on an intra-frequency neighboring cell;

a third factor for relaxing RRM measurement on an inter-frequency neighboring cell;

a fourth factor for relaxing RRM measurement on an inter-system neighboring cell; or a fifth factor for relaxing RRM measurement on a deactivated secondary cell; where any two of the first factor, the second factor, the third factor, the fourth factor and the fifth factor are mutually independent.

In some examples, the stopping the RRM measurement includes at least one of the following:

stopping the RRM measurement on a serving cell;

stopping the RRM measurement on a secondary cell;

stopping the RRM measurement on an intra-frequency neighboring cell;

stopping the RRM measurement on an inter-frequency neighboring cell; or stopping the RRM measurement on an inter-system neighboring cell.

In some examples, different frequency bands have independent the relaxation factors.

In some examples, a value of the relaxation factor is determined according to a configuration situation of a discontinuous reception DRX cycle of the connected UE.

In some examples, the connected UE is not configured with a DRX cycle, and the value of the relaxation factor is a first value;

or, the connected UE is configured with a DRX cycle and the DRX cycle is greater than a first duration, and the value of the relaxation factor is a second value;

or, the connected UE is configured with a DRX cycle and the DRX cycle is less than or equal to the first duration, and the value of the relaxation factor is a third value.

In some examples, the relaxation factor is determined by the connected UE according to a met relaxation condition.

In some examples, different relaxation conditions correspond to the relaxation factors of different values.

In some examples, the relaxation condition of the RRM measurement includes at least one of the following:

determining whether a motion state of the connected UE meets a stationary condition;

or determining whether the connected UE is located in a non-marginal area of a serving cell.

In some examples, different relaxation conditions correspond to the relaxation factors of different values.

An example of the disclosure provides a communication device, including:

a memory, configured to store processor-executable instructions; and one or more processors, connected with the memory; where the one or more processors is configured to execute the RRM measurement relaxation method provided by any aforementioned technical solution.

The processor may include various types of storage media. The storage media are non-temporary computer storage media, and can continue to memorize information stored after the communication device is powered down.

Here, the communication device includes: the aforementioned UE or base station.

The processor may be connected with the memory via a bus and the like, and is configured to read an executable program stored on the memory, such as at least one of the RRM measurement relaxation method and/or the information processing method shown in FIG. 2 to FIG. 5.

Figure 8:
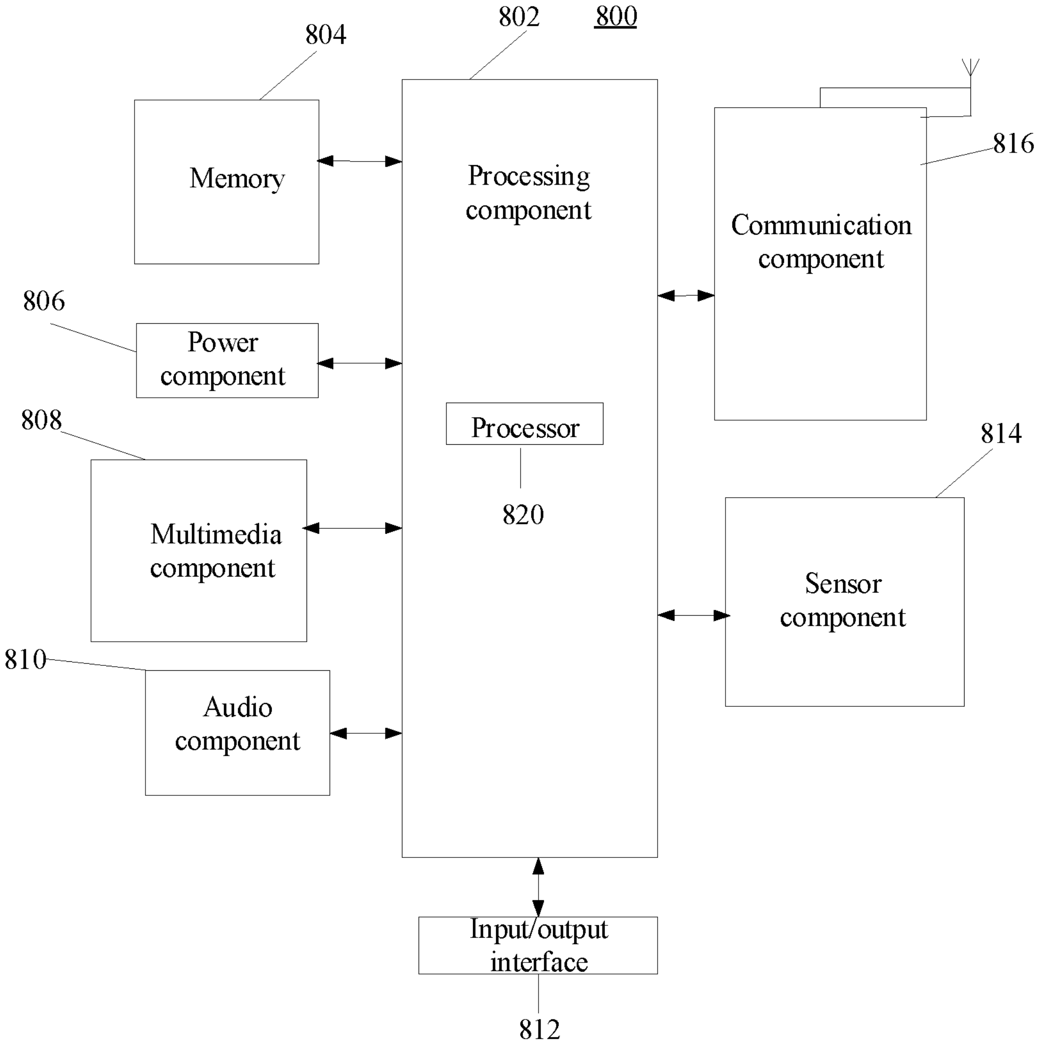
FIG. 8 is a schematic structural diagram of a communication device illustrated according to an example.

FIG. 8 is a block diagram of UE 800 illustrated according to an example. For example, the UE 800 may be a mobile phone, a computer, digital broadcasting user equipment, a messaging device, a game console, a tablet device, a medical device, a fitness device, a personal digital assistant, etc.

Referring to FIG. 8, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the UE 800, such as operations associated with display, telephone calls, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the UE 800. Examples of these data include instructions for any application or method operating on the UE 800, contact data, phonebook data, messages, pictures, videos, etc. The memory 804 may be implemented by any type of volatile or nonvolatile storage device or their combinations, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optic disk.

The power component 806 provides power for various components of the UE 800. The power component 806 may include a power management system, one or more power sources and other components associated with generating, managing and distributing power for the UE 800.

The multimedia component 808 includes a screen providing an output interface between the UE 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor can not only sense the boundary of the touch or sliding motion, but also detect the duration and pressure related to the touch or sliding operation. In some examples, the multimedia component 808 includes a front camera and/or a rear camera. When the UE 800 is in an operation mode, such as a shooting mode or a video mode, the front camera and/or the rear camera can receive external multimedia data. Each front camera and rear camera can be a fixed optical lens system or have a focal length and optical zoom capability.

The audio component 810 is configured to output and/or input audio signals. For example, the audio component 810 includes a microphone (MIC) configured to receive an external audio signal when the UE 800 is in the operation mode, such as a call mode, a recording mode, and a speech recognition mode. The received audio signal may be further stored in the memory 804 or transmitted via the communication component 816. In some examples, the audio component 810 also includes a speaker for outputting an audio signal.

The I/O interface 812 provides an interface between the processing component 802 and a peripheral interface module which can be a keyboard, a click wheel, a button, etc. These buttons may include but are not limited to: a home button, volume buttons, a start button and a lock button.

The sensor component 814 includes one or more sensors for providing state evaluation of various aspects of the UE 800. For example, the sensor component 814 can detect an on/off state of the UE 800 and the relative positioning of the components, for example, the component is a display and a keypad of the UE 800. The sensor component 814 can also detect the change of the position of the UE 800 or one component of the UE 800, the presence or absence of user contact with the UE 800, the azimuth or acceleration/deceleration of the UE 800, and temperature change of the UE 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the UE 800 and other devices. The UE 800 may access a wireless network based on a communication standard, such as WiFi, 2G or 3G, or their combinations. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology and other technologies.

In an example, the UE 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above method.

In an example, a non-temporary computer-readable storage medium including instructions, such as the memory 804 including instructions, which can be executed by the processor 820 of the UE 800 to complete the RRM measurement relaxation method, is also provided. For example, the non-temporary computer readable storage medium may be a ROM, a random access memory (RAM), a CD-ROM, a magnetic tape, a floppy disk, an optical data storage device, etc.

Figure 9:
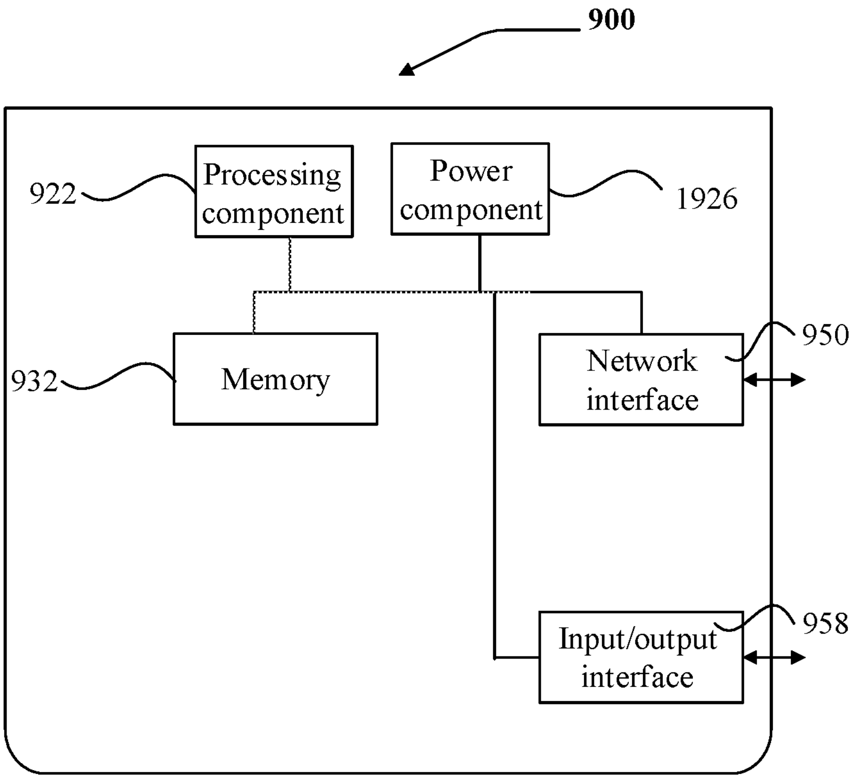
FIG. 9 is a schematic structural diagram of a communication device illustrated according to an example.

As shown in FIG. 9, an example of the disclosure shows a structure of an access device. For example, a communication device 900 may be provided as a network side device. The communication device may be the aforementioned access device. The access device includes but is not limited to a base station.

Referring to FIG. 9, the communication device 900 includes a processing component 922, which further includes one or more processors, and a memory resource represented by a memory 932 for storing instructions, such as applications, that can be executed by the processing component 922. The applications stored in the memory 932 may include one or more modules each corresponding to a set of instructions. In addition, the processing component 922 is configured to execute instructions to execute any method applied to the access device above, such as the RRM measurement relaxation method and/or the information processing method as shown in FIG. 2 to FIG. 5.

The communication device 900 may further include a power component 926 configured to perform power management of the communication device 900, a wired or wireless network interface 950 configured to connect the communication device 900 to the network, and an input/output (I/O) interface 958. The communication device 900 can operate an operating system stored in the memory 932, such as Windows Server™, Mac OS X™, Unix™, Linux™, FreeBSD™, or the like.

Other implementation solutions of the disclosure will be apparent to those skilled in the art from consideration of the specification and practice of the disclosure here. The disclosure is intended to cover any variations, uses, or adaptations of the disclosure following its general principles and including such departures from the disclosure as come within known or customary practice in the art. It is intended that the specification and examples are considered as examples, with a true scope and spirit of the disclosure being indicated by the following claims.

It will be appreciated that the disclosure is not limited to the exact construction that has been described above and illustrated in the accompanying drawings, and that various modifications and changes may be made without departing from its scope. The scope of the disclosure is merely limited by the appended claims.

The invention claimed is:

1. A radio resource management (RRM) measurement relaxation method, performed by a connected user equipment (UE), and comprising:
- determining an RRM measurement relaxation,
- wherein determining the RRM measurement relaxation comprises:
- determining to relax an RRM measurement,
- wherein the RRM measurement relaxation method further comprises:
- determining a relaxation factor for the RRM measurement of the connected UE; and
- determining a relaxation configuration of the RRM measurement according to the relaxation factor, wherein the relaxation factor is a relaxation coefficient, and the relaxation coefficient is greater than or equal to 1,
- wherein relaxation factors for different frequency bands are independent from each other.

2. The RRM measurement relaxation method according to claim 1, wherein the relaxation configuration indicates at least one of the following:
- a relaxation manner configuration, indicating a relaxation manner of the RRM measurement; or
- a relaxation measurement configuration, indicating a measurement configuration after relaxing the RRM measurement;
- wherein the relaxation manner comprises at least one of:
  - increasing a cycle associated with the RRM measurement; or
  - stopping the RRM measurement;
  - wherein the stopping the RRM measurement comprises at least one of the following:
    - stopping the RRM measurement on a serving cell;
    - stopping the RRM measurement on a secondary cell;
    - stopping the RRM measurement on an intra-frequency neighboring cell;
    - stopping the RRM measurement on an inter-frequency neighboring cell; or
    - stopping the RRM measurement on an inter-system neighboring cell.

3. The RRM measurement relaxation method according to claim 2, wherein determining the relaxation configuration of the RRM measurement according to the relaxation factor comprises:
- upon determining that the relaxation manner is increasing the cycle associated with the RRM measurement, obtaining, according to the relaxation factor, an associated cycle after relaxing the RRM measurement; or
- upon determining that the relaxation manner is stopping the RRM measurement, determining a duration of stopping the RRM measurement according to the relaxation factor;

wherein the cycle associated with the RRM measurement comprises at least one of the following:

a recognition cycle of RRM measurement on a serving cell;

a measurement cycle of RRM measurement on the serving cell;

a recognition cycle of RRM measurement on a neighboring cell; or a measurement cycle of RRM measurement on the neighboring cell.

4. The RRM measurement relaxation method according to claim 3, wherein upon determining that the relaxation manner is increasing the cycle associated with the RRM measurement, obtaining, according to the relaxation factor, the associated cycle after relaxing the RRM measurement comprises:

determining the relaxation factor for the RRM measurement of the connected UE; and obtaining, according to the relaxation factor, the associated cycle after relaxing the RRM measurement by increasing an associated cycle before relaxing the RRM measurement.

5. The RRM measurement relaxation method according to claim 1, wherein the relaxation factor for the RRM measurement of the connected UE is smaller than a relaxation factor for the RRM measurement of a non-connected UE.

6. The RRM measurement relaxation method according to claim 1, wherein the relaxation factor comprises at least one of the following:

a first factor for relaxing the RRM measurement on a serving cell;

a second factor for relaxing RRM measurement on an intra-frequency neighboring cell;

a third factor for relaxing RRM measurement on an inter-frequency neighboring cell;

a fourth factor for relaxing RRM measurement on an inter-system neighboring cell; or a fifth factor for relaxing RRM measurement on a deactivated secondary cell;

wherein any two of the first factor, the second factor, the third factor, the fourth factor and the fifth factor are mutually independent.

7. The RRM measurement relaxation method according to claim 3, wherein upon determining that the relaxation manner is increasing the cycle associated with the RRM measurement, obtaining, according to the relaxation factor, the associated cycle after relaxing the RRM measurement relaxation comprises:

upon determining that the relaxation manner is increasing the cycle associated with the RRM measurement, obtaining the associated cycle after relaxing the RRM measurement based on a product of the relaxation factor and an associated cycle before relaxing the RRM measurement.

8. The RRM measurement relaxation method according to claim 1, wherein determining the relaxation factor for the RRM measurement of the connected UE comprises:

determining a value of the relaxation factor according to a configuration of a discontinuous reception (DRX) cycle of the connected UE;

wherein determining the value of the relaxation factor according to the configuration of the DRX cycle of the connected UE comprises one of the following:

upon determining that the connected UE is not configured with the DRX cycle, determining that the value of the relaxation factor is a first value;

upon determining that the connected UE is configured with the DRX cycle and the DRX cycle is greater than a first duration, determining that the value of the relaxation factor is a second value; or upon determining that the connected UE is configured with the DRX cycle and the DRX cycle is less than or equal to the first duration, determining that the value of the relaxation factor is a third value.

9. The RRM measurement relaxation method according to claim 1, further comprising:

determining whether a relaxation condition for the RRM measurement of the connected UE is met;

wherein determining the RRM measurement relaxation comprises:

determining that the relaxation condition for the RRM measurement of the connected UE is met, and determining to relax the RRM measurement;

wherein determining whether the relaxation condition for the RRM measurement of the connected UE is met comprises at least one of the following:

determining whether a motion state of the connected UE meets a stationary condition; or determining whether the connected UE is located in a non-marginal area of a serving cell.

10. The RRM measurement relaxation method according to claim 9, wherein determining the relaxation factor for the RRM measurement of the connected UE comprises:

determining a relaxation factor for the RRM measurement of the connected UE according to the met relaxation condition;

wherein different relaxation conditions correspond to relaxation factors of different values.

11. A communication device, comprising one or more processors, a transceiver, a memory and an executable program stored on the memory and capable of being operated by the one or more processors, wherein the executable program, when executed by the one or more processors, causes the one or more processors to perform steps of the method provided by claim 1.

12. A non-transitory computer storage medium, storing an executable program, wherein the executable program, after being executed by one or more processors, is capable of implementing the method provided by a claim 1.

13. An information processing method, performed by a base station, and comprising:

receiving a radio resource management (RRM) measurement result of a connected UE after an RRM measurement relaxation, wherein the RRM measurement relaxation comprises relaxing an RRM measurement, wherein the RRM measurement is performed according to a relaxation configuration, and the relaxation configuration is determined according to a relaxation factor for the RRM measurement of the connected UE, wherein the relaxation factor is a relaxation coefficient, and the relaxation coefficient is greater than or equal to 1, and wherein relaxation factors for different frequency bands are independent from each other.

14. The information processing method according to claim 13, wherein the relaxation configuration indicates at least one of the following:

a relaxation manner configuration, indicating a relaxation manner of the RRM measurement; or a relaxation measurement configuration, indicating a measurement configuration after relaxing the RRM measurement;

wherein the relaxation manner comprises at least one of:

increasing a cycle associated with the RRM measurement; or stopping the RRM measurement;

wherein the cycle associated with the RRM measurement comprises at least one of the following:

a recognition cycle of RRM measurement on a serving cell;

a measurement cycle of RRM measurement on the serving cell;

a recognition cycle of RRM measurement on a neighboring cell; or a measurement cycle of RRM measurement on the neighboring cell;

wherein the relaxation factor comprises at least one of the following:

a first factor for relaxing the RRM measurement on a serving cell;

a second factor for relaxing RRM measurement on an intra-frequency neighboring cell;

a third factor for relaxing RRM measurement on an inter-frequency neighboring cell;

a fourth factor for relaxing RRM measurement on an inter-system neighboring cell; or a fifth factor for relaxing RRM measurement on a deactivated secondary cell;

wherein any two of the first factor, the second factor, the third factor, the fourth factor and the fifth factor are mutually independent; and wherein the stopping the RRM measurement comprises at least one of the following:

stopping the RRM measurement on a serving cell;

stopping the RRM measurement on a secondary cell;

stopping the RRM measurement on an intra-frequency neighboring cell;

stopping the RRM measurement on an inter-frequency neighboring cell; or stopping the RRM measurement on an inter-system neighboring cell.

15. The information processing method according to claim 14, wherein the relaxation factor for the RRM measurement of the connected UE is smaller than a relaxation factor for the RRM measurement of a non-connected UE.

16. The information processing method according to claim 14, wherein a value of the relaxation factor is determined according to a configuration of a discontinuous reception (DRX) cycle of the connected UE;

wherein the connected UE is not configured with the DRX cycle, and the value of the relaxation factor is a first value; or, the connected UE is configured with the DRX cycle and the DRX cycle is greater than a first duration, and the value of the relaxation factor is a second value; or, the connected UE is configured with the DRX cycle and the DRX cycle is less than or equal to the first duration, and the value of the relaxation factor is a third value.

17. The information processing method according to claim 14, wherein the relaxation factor is determined by the connected UE according to a met relaxation condition;

wherein different relaxation conditions correspond to relaxation factors of different values;

wherein the relaxation condition of the RRM measurement comprises at least one of the following:

determining whether a motion state of the connected UE meets a stationary condition; or determining whether the connected UE is located in a non-marginal area of a serving cell.

* * * * *